United States Patent [19]

Schoenmakers et al.

[11] Patent Number: 4,468,711
[45] Date of Patent: Aug. 28, 1984

[54] MODE-SWITCHING LINKAGE FOR A TAPE CASSETTE APPARATUS

[75] Inventors: Johannes J. M. Schoenmakers; Ghislanus M. A. M. Aldenhoven, both of Eindhoven, Netherlands

[73] Assignee: U.S. Philips Corporation, New York, N.Y.

[21] Appl. No.: 317,680

[22] Filed: Nov. 2, 1981

[30] Foreign Application Priority Data

Nov. 17, 1980 [NL] Netherlands ................. 8006257

[51] Int. Cl.³ ............................................. G11B 15/02
[52] U.S. Cl. ..................................... 360/96.3; 360/90
[58] Field of Search ............... 360/69, 71, 72.2, 74.4, 360/90, 96.3, 96.6, 105, 137

[56] References Cited

U.S. PATENT DOCUMENTS

| 3,244,018 | 4/1966 | Loa et al. ............... 360/96.3 |
| 4,149,202 | 4/1979 | Terada et al. ........... 360/96.3 |
| 4,224,647 | 9/1980 | Umezawa et al. ...... 360/96.3 |
| 4,253,123 | 2/1981 | Hayashi et al. ........ 360/137 X |
| 4,301,482 | 11/1981 | Trevithick ............. 360/74.4 X |
| 4,318,138 | 3/1982 | Osanai ..................... 360/69 |
| 4,330,801 | 5/1982 | Morinaga et al. ........ 360/69 |
| 4,348,704 | 9/1982 | Takagi et al. .......... 360/137 X |
| 4,399,475 | 8/1983 | Shimonae .............. 360/96.3 |

FOREIGN PATENT DOCUMENTS 1047032 11/1966 United Kingdom .

*Primary Examiner*—Aristotelis M. Psitos
*Attorney, Agent, or Firm*—David R. Treacy

[57] ABSTRACT

A tape recorder or player having a central drive wheel and pivotable fast mode and normal mode idler arms. A switching lever pivots from a rest position to a first operative position to permit central drive wheel rotation to swing the fast mode idler against either reel drive spindle, or to a second operative position to enable normal mode idler operation. The head slide is also coupled to the lever in the operating position, and a control device limits lever movement to the first position for fast mode use.

10 Claims, 14 Drawing Figures

MODE-SWITCHING LINKAGE FOR A TAPE CASSETTE APPARATUS

BACKGROUND OF THE INVENTION

The invention relates to an apparatus for recording and/or reproducing signals on a magnetic tape; and more particularly, to such an apparatus having two reel discs, at least one magnetic head, a pressure roller which is arranged on a pivotable pressure-roller arm and which is movable against a capstan, and idler wheels, which are adapted to be driven by a central drive wheel, for driving the reel discs. Typically a normal-mode idler wheel and a fast-mode idler wheel are arranged on pivotable normal-mode and fast-mode idler arms respectively, which are each movable between an inoperative position and at least one operative position. In the operative position the normal-mode idler wheel and the fast-mode idler wheel respectively engage with one of the reel discs for normal or fast transport of the magnetic tape respectively. Brake arms are also provided which are movable to engage the reel discs with active portions of the brake arms. The apparatus further includes a switching lever which is pivotable by a central actuating device. For positioning the pressure roller arm, the normal-mode idler arm, the fast-mode idler arm and the brake arms, the switching lever is coupled to these arms.

An apparatus of this type is known from British Patent Specification No. 1,047,032 to which U.S. Pat. No. 3,244,018 corresponds. In this known apparatus the arms are controlled by a central actuating device, but in this case the actuating device itself is not capable of pivoting the switching lever. The actual pivotal movement is provided by a mechanical coupling between the switching lever and the actuating buttons on the apparatus, as a result of which the construction of the known apparatus is comparatively intricate. Furthermore, it is not possible with the known apparatus to perform the customary functions when magnetic tapes accommodated in cassettes are used, because the actuating device cannot provide a displacement of the magnetic head and does not have a fast-winding facility in two directions.

In U.S. Pat. No. 4,149,202 a magnetic-tape cassette apparatus is described in which various functions are controlled by means of a central actuating device. However, this central actuating device comprises a switching lever which can only be set to two instead of three positions. For this reason the known apparatus comprises an additional actuating device for switching to a fast-wind mode, which additional actuating device lifts the brake arms and releases the fast-mode idler arm to pivot the fast-mode idler wheel to an operating position. This results in a more intricate and expensive construction.

SUMMARY OF THE INVENTION

It is an object of the invention to provide an apparatus having a control linkage which is suitable for use in conjunction with magnetic tapes contained in cassettes and in which the necessary functions are controlled by means of a central actuating device.

According to the invention this object is achieved in that the central device wheel can be driven selectively in either direction of rotation and tends to pivot the fast-mode idler arm, so that when the fast-mode idler arm is uncoupled from the switching lever the fast-mode idler wheel is moved from an inoperative central position between the reel discs towards one or the other reel disc respectively into a first or second operative position respectively; in that the pivotal movement of the switching lever is effected solely by the central actuating device; in that the apparatus includes control means which can be set to two positions, pivotal movement of the switching lever being limited to movement from a rest position into a first, partly pivoted operating position when the control means are set to a first position, in which position the fast-mode idler arm is uncoupled from the switching lever and the normal-mode idler wheel is maintained in the inoperative position through the coupling of the normal-mode idler arm with the switching lever; in that the switching lever is pivotable into a second, fully pivoted operating position when the control means are set to the second position, in which position the fast-mode idler wheel is maintained in the central position through the coupling of the fast-mode idler arm with the switching lever and the normal-mode idler wheel occupies the operative position through the coupling of the normal-mode idler arm with the switching lever; and in that the switching lever is coupled in both operating positions to a movable head slide which carries the magnetic head.

The apparatus in accordance with the invention enables all the customary functions in cassette equipment, such as fast winding, playing and stopping, to be controlled by means of a central actuating device. Such a central arrangement of the actuating device is of great advantage for the construction of the apparatus, because it enables the control buttons which control the actuating device to be arranged at a convenient location on the apparatus. The construction in accordance with the invention has the further advantage that a comparatively small number of components are required for controlling the various functions of the apparatus, so that the apparatus is comparatively simple to assemble and a comparatively small actuating force is required. A further advantage of the construction in accordance with the invention is the comparatively small space in which the various components of the apparatus can be accommodated.

In a preferred embodiment of an apparatus in accordance with the invention there is provided a movable blocking element, which comprises a stop for limiting the pivotal movement of the switching lever, the stop being operative only in the first position of the control means by positioning of the blocking element. In this way it is possible to position the switching lever accurately in the first operating position, which is situated between the rest position and the second operating position, so that in this first operating position the parts coupled to the switching lever are also positioned accurately.

In this embodiment the control means preferably comprise a retaining element which positions the blocking element and which is adapted to be coupled to the blocking element, the retaining element being coupled to the blocking element in only the second position of the control means, as a result of which coupling the stop is inoperative. Thus, the use of the retaining element ensures that in the second position of the control means the switching lever will accurately occupy the second operating position.

In this embodiment it is further preferred that the blocking element be connected to the central actuating device by a spring, in the coupled position the force exerted on the blocking element by the retaining element being greater than the force exerted by the spring. Thus, by means of the central actuating device the blocking element can be positioned to limit the pivotal movement of the switching lever, while by the actuation of the retaining element the connection between the blocking element and the central actuating device can temporarily be rendered inoperative.

Another aspect of the invention is characterized in that a limiting element is movable with the switching lever, and solely in the first position of the control means cooperates with the stop to limit the pivotal movement of the switching lever into the first operative position, this operative position being defined by the point of intersection of the paths of movement of the stop and the limiting element. By thus having the stop on the blocking element cooperate with a limiting element which is also actuated by the switching lever, an accurate positioning of the blocking element in the first position of the control means is obtained with a comparatively small displacement of the blocking element.

Yet another embodiment in accordance with the invention is characterized in that a latching element latches the fast-mode idler wheel in the control position between the reel discs in the second position of the control means during the pivotal movement of the switching lever. This ensures that in the second position of the control means, when the switching lever is pivoted into the second operating position the fast-mode idler wheel occupies an inoperative position.

In this respect it is of advantage if the latching element is integral with the blocking element which carries the stop and in the second position of the control means the latching element occupies an operative position through the coupling of the blocking element with the retaining element.

In a preferred cassette apparatus in accordance with the invention at least one brake arm comprises a control profile which cooperates with the normal-mode idler arm for controlling the pivotal movement of the normal-mode idler wheel between the inoperative and the operative position. Thus, the normal-mode idler wheel is reliably positioned in the inoperative or the operative position by the pivotal movement of the switching lever from the rest position into the respective one of the two operating positions.

A further preferred cassette apparatus in accordance with the invention is characterized in that the switching lever comprises a positioning profile for the head slide, along which profile a stop connected to the head slide is movable, and which profile comprises three adjoining guide portions for positioning the head slide in three positions, which positions respectively correspond to the rest position and the first and second operating positions of the switching lever, and in that the head slide is adapted to be coupled to a movable positioning element for positioning the head slide in a fourth, neutral position. Due to this construction of the switching lever and to the provision of the positioning element the apparatus in accordance with the invention is optimized for locating particular program sections on the tape.

The invention will be described in more detail with reference to the drawings, which show some embodiments.

DESCRIPTION OF THE PREFERRED EMBODIMENTS

Figure 1:
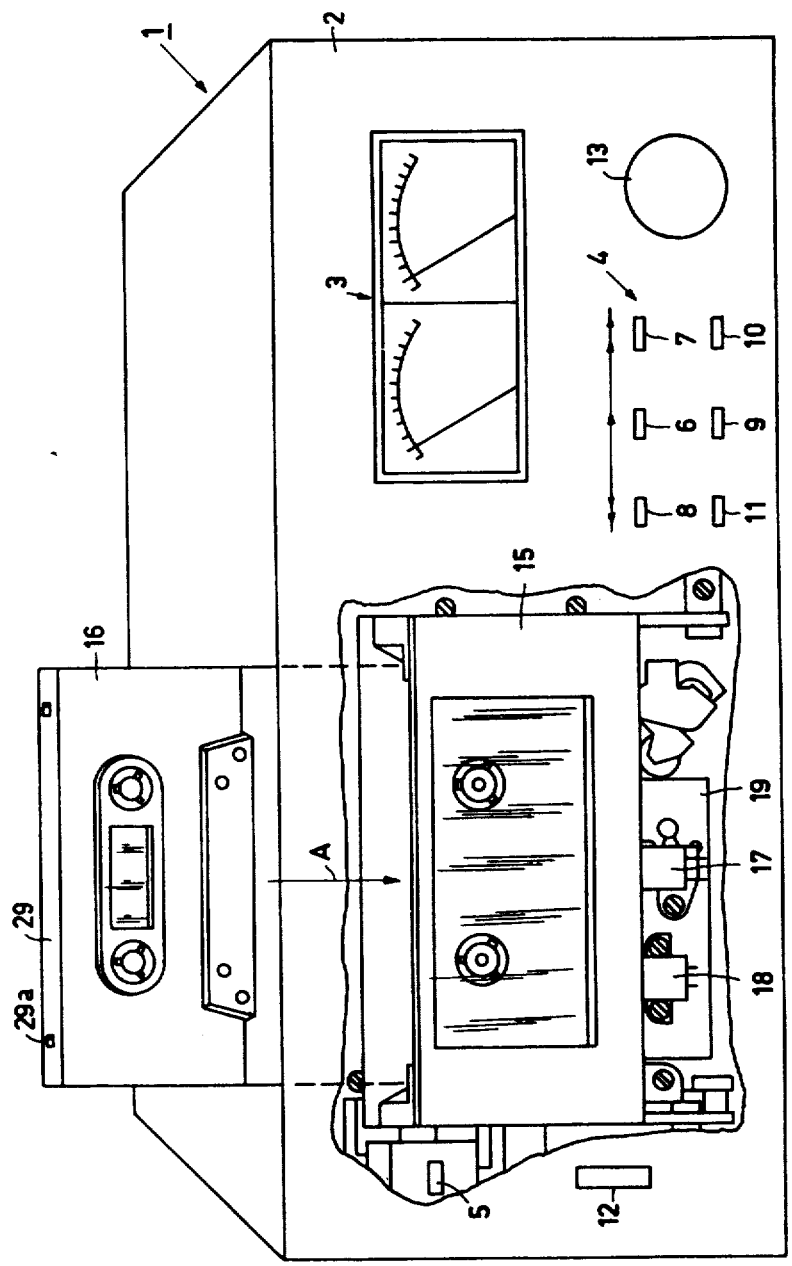
FIG. 1 is a front view of an apparatus in accordance with the invention, also showing part of the interior of the apparatus.

The apparatus shown in FIG. 1 comprises a housing 1 having a front plate 2, on which a number of components intended for operating the apparatus are located. These components include meters 3, electrically operating control buttons 4, as well as an eject button 5. The control buttons 4 comprise a play button 6, a fast wind button 7, a fast rewind button 8, a stop button 9, a pause button 10 and a record button 11.

Also located on the front plate 2 is a switch 12, by which the mains voltage can be switched on and off. The recording level of the signal to be recorded on a magnetic tape can be controlled with the aid of a rotary knob 13 and can be read on the meters 3. Further control elements located on the front plate are not shown for the sake of clarity.

Cassette Holder and Head Slide

Figure 2:
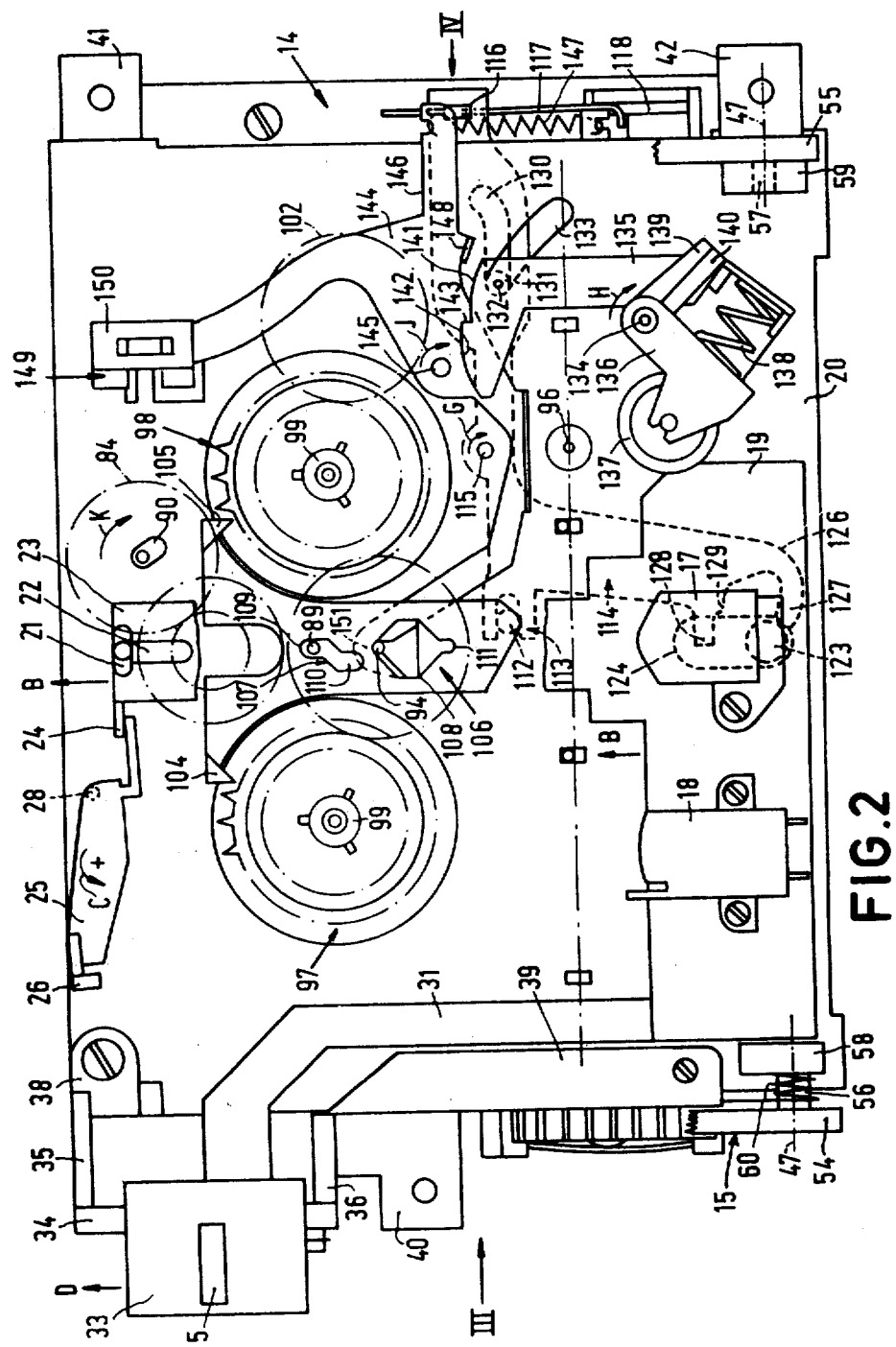
FIG. 2 is a front view, on an enlarged scale, of the part of the interior of the apparatus shown in FIG. 1, a cassette holder adapted to receive a magnetic-tape cassette, and also some other parts of the apparatus, being omitted for the sake of clarity and the apparatus being shown in a neutral position.
Figure 5:
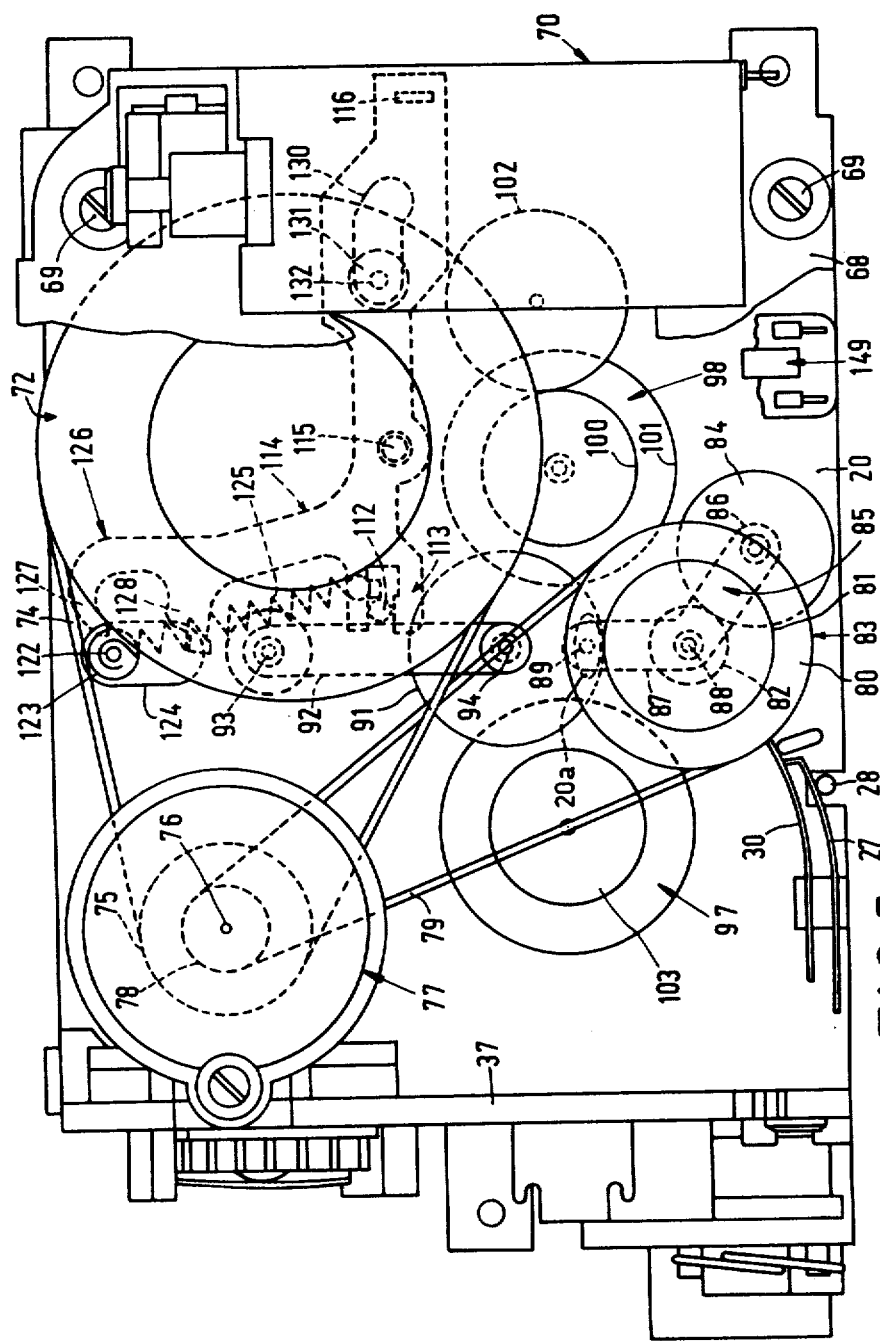
FIG. 5 is an inverted rear view of the part of the interior of the apparatus shown in FIG. 2, a number of parts being omitted for the sake of clarity.
Figure 6:
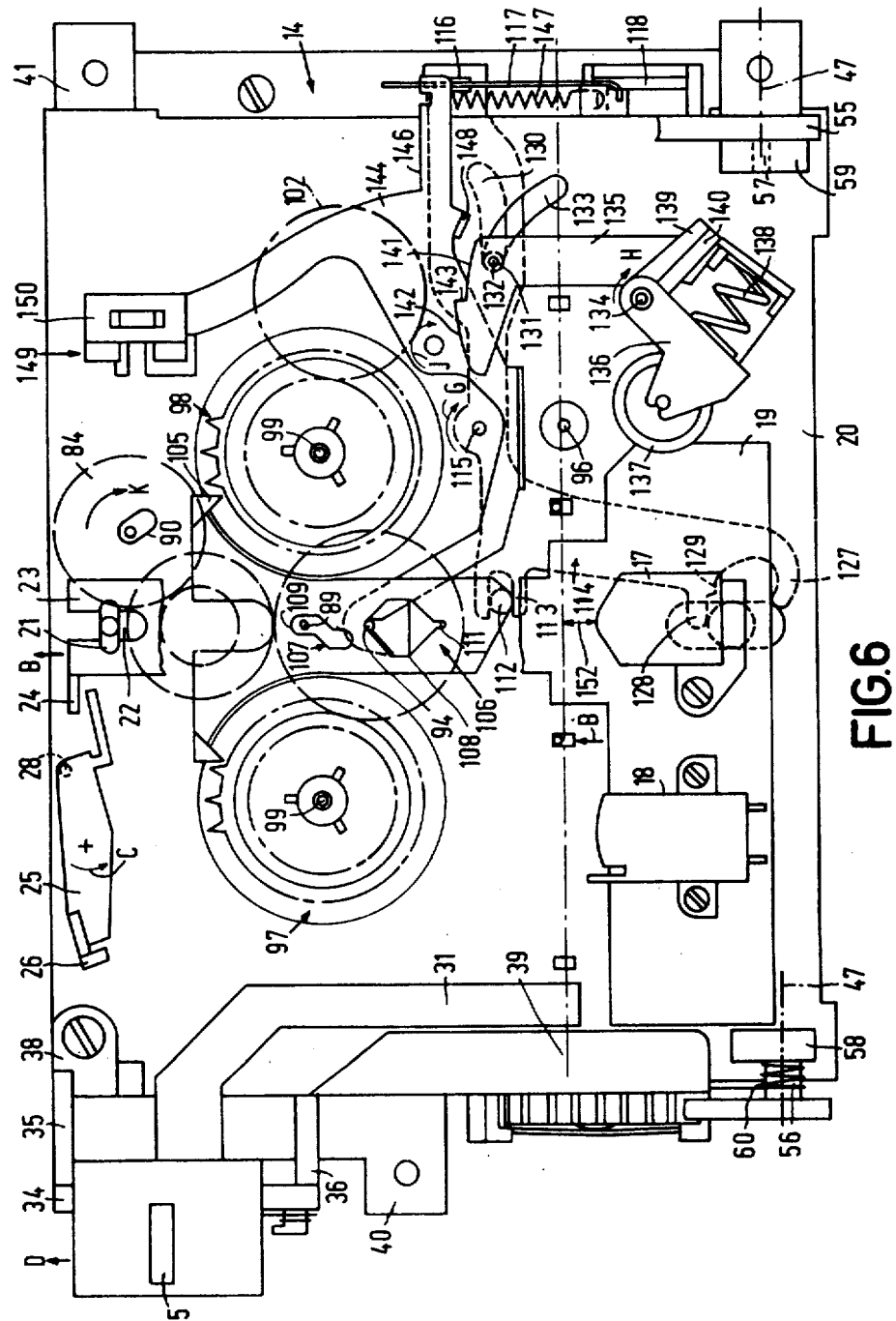
FIG. 6 is a view similar to FIG. 2 showing the part of the interior of the apparatus shown in FIG. 2 in a rest position.

The part of the interior of the apparatus shown in FIG. 2, namely a tape deck 14, is accommodated inside the housing 1 and includes a cassette holder 15 being pivotable out of the front plate 2. When thus pivoted the cassette holder 15 is capable of receiving a magnetic-tape cassette 16, shown in FIG. 1, by inserting the cassette in the direction of the arrow A in FIG. 1. The cassette holder is pivoted to the position shown in FIG. 3 through an angle of approximately 30° relative to the front plate 2. At the side of the holder 15 which is remote from the insertion opening of the holder a combined magnetic recording playback head 17 and a magnetic erase head 18 are arranged on the tape deck 14, which magnetic heads are mounted on a head slide 19. The head slide 19 is arranged to be slidable on a first frame plate 20 which extends parallel to the front plate 2. For guiding this sliding movement a T-shaped guide element 21 is arranged on the frame plate 20, which element cooperates with a slot 22 in plate-shaped arm 23 of the head slide 19. The arm 23 extends parallel to the first frame plate 20, the free end of the arm 23 being situated near the edge of the first frame plate 20 which is remote from the magnetic heads. Near its free end the arm 23 carries a projection 24, which is adapted to cooperate with a pivotable sensing element 25 which is provided with a sensor 26. The sensor 26 is positioned so that when the cassette holder 15 is in the closed position (as is shown in FIG. 6), the sensor is pivoted in the direction of the arrow C in FIG. 2 owing to the force exerted on a pin 28 of the sensing element 25 by a leaf spring 27 (FIG. 5) when the head slide 19 with the arm 23 is moved in the direction of the arrow B in FIG. 2. By means of this pivotal movement the sensor 26 can sense the presence of an anti-erase opening 29a in the rear wall 29 of the cassette 16. If this opening is present, the sensor can enter the opening and thereby pivot further in the direction of the arrow C. As a result of this, the leaf spring 27 in FIG. 5 is disengaged from a second leaf spring 30 so that an electric contact is opened, thereby preventing signals from being recorded on the magnetic tape.

Figure 3:
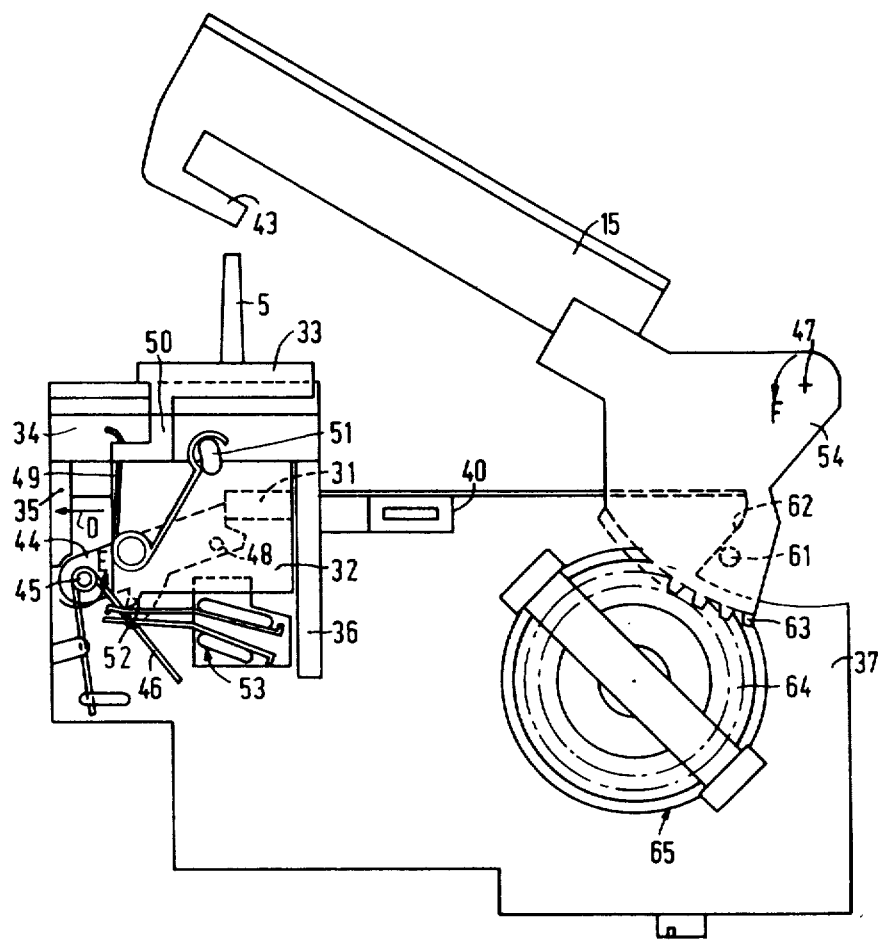
FIG. 3 is a side view, on an enlarged scale, of part of the interior of the apparatus, looking in the direction of the arrow III in FIG. 2.

In the open position of the cassette holder 15 the free lower end of a plastic arm 31 presses against an edge of the head slide 19. The arm 31 extends parallel to the first frame plate 20 and comprises an end portion which extends laterally beyond the edge of the frame plate 20 and is rigidly connected to a switching plate 32 (see FIG. 3) which extends perpendicularly to the frame plate 20 and which, as is shown in FIG. 3, is rigidly connected to a base plate 33 on which the eject button 5 is mounted. The base plate 33 is slidable in the direction of the arrow D in FIG. 2, as a result of which movement the free end of the arm 31 is also moved in the direction of the arrow D, so that the free end becomes disengaged from the edge of the head slide 19 (see FIG. 6). During the movement the plates 32 and 33 are guided along a guide plate 34, which by means of two supports 35 and 36 is rigidly connected to a plastics side plate 37 which extends perpendicularly to the first frame plate 20. The side plate 37 is provided with fixing portions 38 and 39 which extend parallel to the frame plate 20 and which are secured to the frame plate 20 by means of screws. Furthermore, the side plate 37 comprises a projecting lug 40 which, together with the lugs 41 and 42 on that edge of the frame plate 20 which is remote from the side plate 37, serve for securing the tape deck 14 inside the housing 1.

Figure 7:
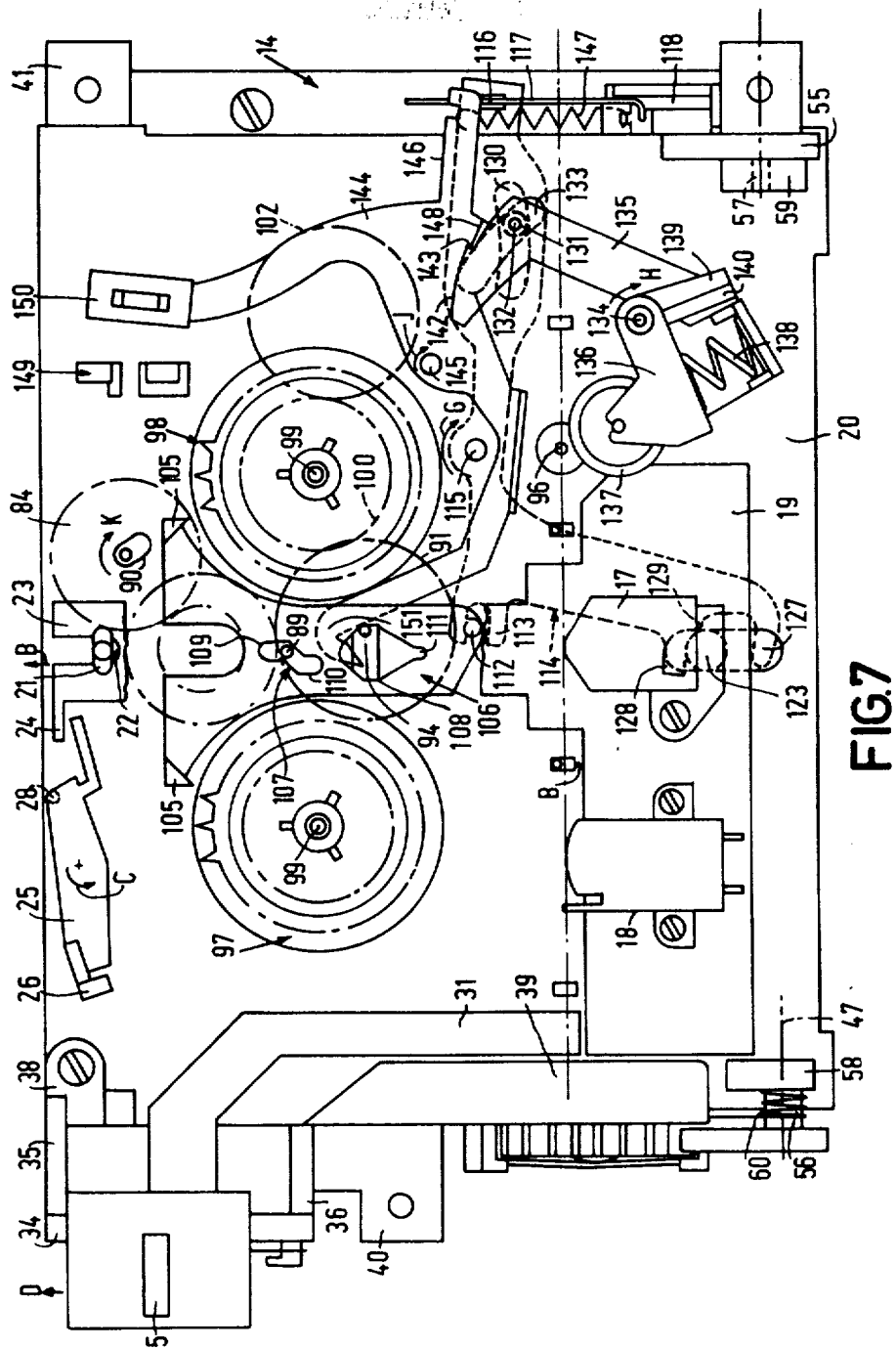
FIG. 7 is a view similar to FIG. 2 showing the part of the interior of the apparatus shown in FIG. 2 in a first operating position.
Figure 8:
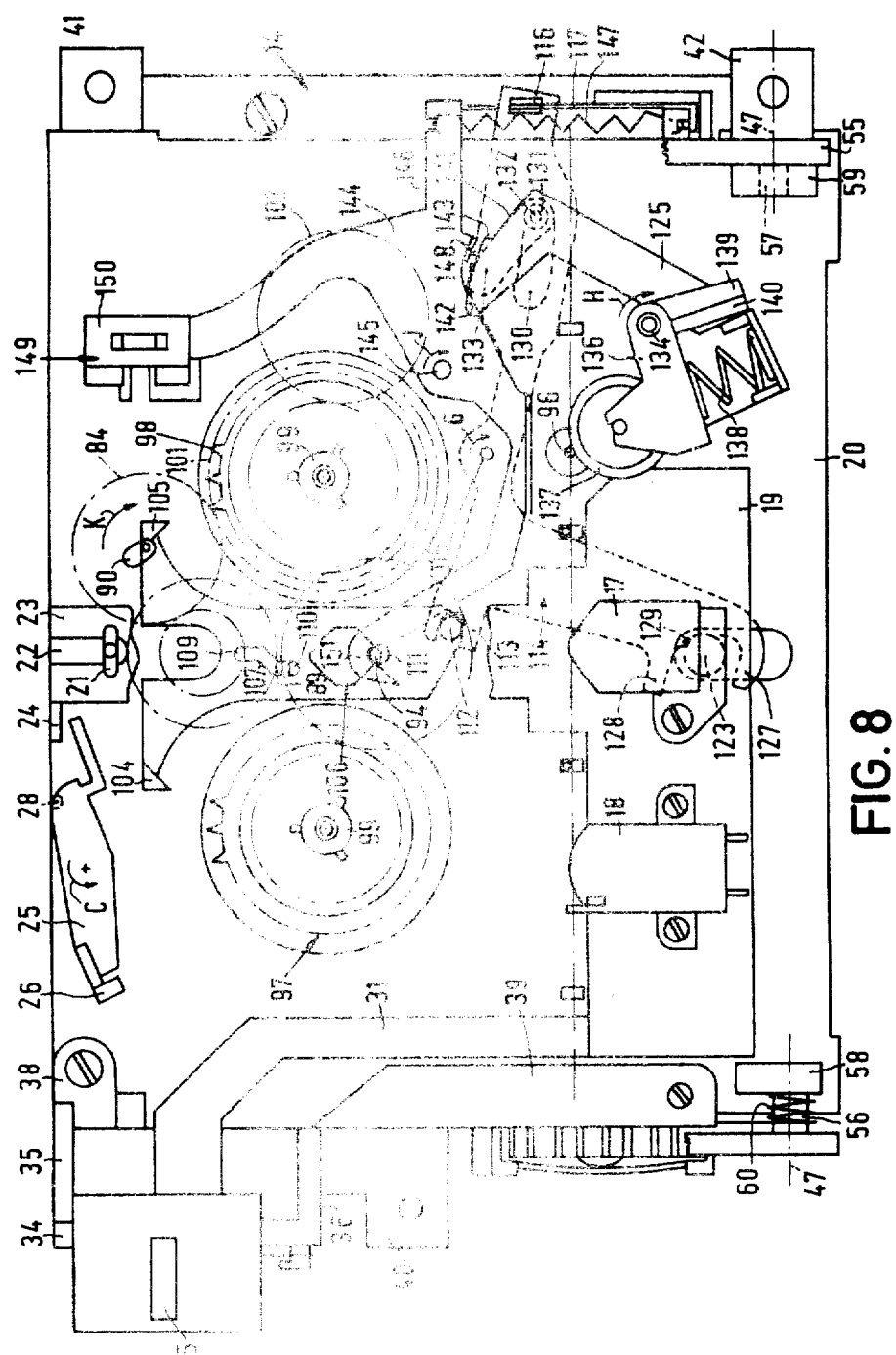
FIG. 8 is a view similar to FIG. 2 showing said part of the interior of the apparatus in a second operating position.

As is shown in FIG. 3, the cassette holder 15 is provided with a hook-shaped projection 43, which can engage behind the portion of the arm 31 situated near the switching plate 32 to latch the cassette holder 15 in the closed position when the parts of the tape deck are in the positions represented in FIGS. 6, 7 and 8. In order to enable the arm 31, with the button 5, to be retained in the position shown in FIGS. 1-3, there is provided a latching mechanism 44, which is pivotable about a spindle 45 and which, with its end which is remote from the spindle 45, engages with the end portion of the arm 31. The latching mechanism 44 is urged into the position shown in FIG. 3 by means of a spring 46, which tends to pivot the latching mechanism 44 in the direction of the arrow E in FIG. 3. When the cassette holder 15 is pivoted about its pivotal axis 47 in the direction represented by the arrow F in FIG. 3, the projection 43 will contact a pin 48 on the latching mechanism 44 so that the latching mechanism is pivoted in a direction opposite to the arrow E and the arm 31 is consequently released. By means of a spring 49 which acts between a lug 50 on the base plate 33 and a projection 51 on the guide plate 34, the arm 31 is resiliently moved in the direction of the arrow D in FIG. 2. Furthermore, by means of a projection 52 on the rear edge of the switching plate 32, a switch 53 is closed for a moment during the movement of the base plate 33 in the direction of the arrow D. This switch, among other things, serves for protecting the various functions of the tape deck, so that these functions are switched off when the cassette holder 15 is moved from the closed to the open position.

As is shown in FIGS. 2 and 3 the cassette holder 15 is pivotably journalled in supports 58 and 59 by means of limbs 54 and 55 and trunnions 56 and 57 on the holder, which supports are arranged on the front of the first frame plate 20. The pivotal axis 47 coincides with the axes of the trunnions 58 and 57. Around the trunnion 56 a helical torsion spring 60 is arranged, whose ends bear on the cassette holder 15 and the fixing portion 39 respectively. Thus, the cassette holder 15 is moved in a direction opposite to the arrow F in FIG. 3 by the torsion spring 60, a stop 61, which is mounted on the limb 54, engaging with an edge 62 of the side plate 37 in the open position shown in FIG. 3. The limb 54 is provided with teeth 63, which cooperate with a gear wheel 64 which forms part of a damping device 65. The damping device 65 is constructed as a grease damper, which damps the pivotal movement of the holder 15 about the pivotal axis 47.

Frame and Drive Parts

Figure 4:
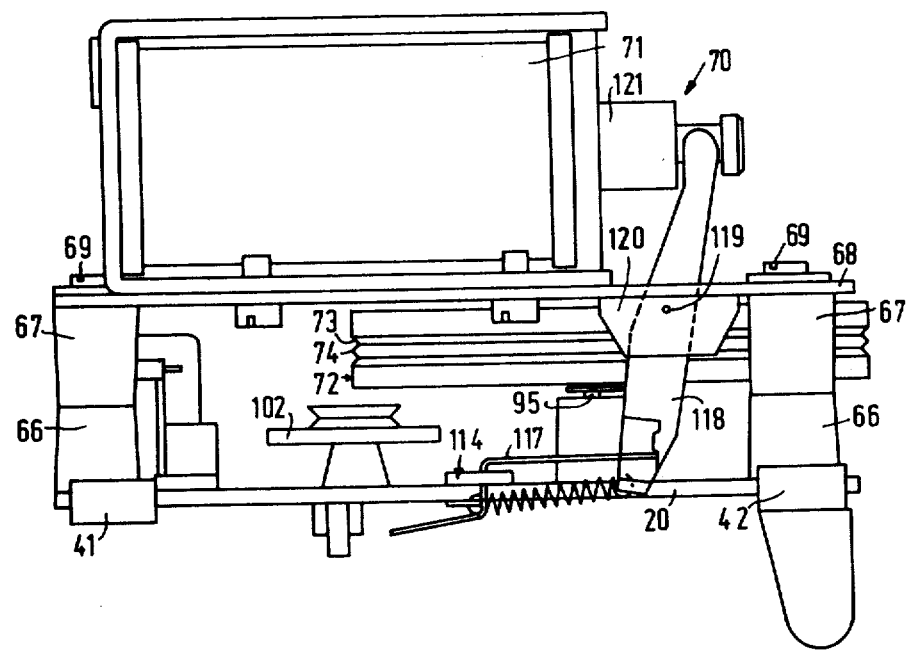
FIG. 4 is a side view, on an enlarged scale, of part of the interior of the apparatus, looking in the direction of the arrow IV in FIG. 2.

As is shown in FIG. 4, a plurality of bushes 66 is mounted on the side of the first frame plate 20 which is remote from the magnetic heads, which bushes like the other plastic parts (such as the guide element 21) located on the frame plate 20, are molded on the frame plate 20 by means of the so-called "outsert molding" technique. The ends of the bushes 66 which are remote from the plate 20 abut the ends of bushes 67 which are also molded on a second frame plate 68 by means of an outsert molding technique, which second frame plate extends parallel to the first frame plate 20. The bushes 66 are internally threaded, threaded bolts 69 extending through the bushes 67 and screwing into the bushes 66. In this way the two frame plates 20 and 68 are rigidly connected to each other. A central actuating device 70 of the tape deck is secured to the side of the frame plate 68 which is remote from the frame plate 20, which device comprises a solenoid 71. A flywheel 72 is situated between the two frame plates 20 and 68, which flywheel is journalled in bearings which are moulded on the frame plates 20 and 68 by means of an outsert moulding technique. Around its circumference the flywheel 72 is formed with a groove 73 in which a belt 74 is guided. As is shown in FIG. 5, the belt 74 is further guided around a pulley 75, which is mounted on the shaft 76 of a motor 77. The motor 77 is secured to that side of the side plate 37 which faces the inside of the tape deck 14. On the end of the motor shaft 76 which is remote from the pulley 75 a second pulley 78 is arranged which has a smaller diameter than the pulley 75. Around the pulley 78 passes a second belt 79 which further passes around a pulley 80. Said pulley 80 is journalled between the frame plates 20 and 68 in the same way as the flywheel 72. The pulley 80 forms a unit with a comparatively large gear wheel 81 and a comparatively small gear wheel 82.

Together the gear wheels 81 and 82 and the pulley 80 constitute a central drive wheel 83. The teeth of the comparatively small gear wheel 82 are constantly in mesh with the teeth of a normal-mode idler wheel 84. The idler wheel 84 is journalled on a normal-mode idler arm 85 near the end thereof. The normal-mode idler arm 85 comprises two adjoining portions 86 and 87 arranged in the form of a V, the portion 86 carrying the normal-mode idler wheel 84 and the normal-mode idler arm 85 being pivotably journalled at the junction of its two portions 86 and 87 on the spindle 88 of the central drive wheel 83. At the end which is remote from the spindle 88, the portion 87 carries a pin 89 (see also FIG. 2), which extends through an opening 20a in the plate 28, whose function will be described hereinafter. The opening 20a is large enough to permit movement of the pin 89 during pivoting movement of the arm 85. In order to enable the spindle of the normal-mode idler wheel 84 to move about the axis of the spindle 88, a slot 90 is formed in the first frame plate 20 (FIG. 2).

The teeth of the gear wheel 81 of the central drive wheel 83 are constantly in engagement with the teeth of a fast-mode idler wheel 91 which is mounted on a fast-mode idler arm 92 which is pivotable about a spindle 93 mounted in a bearing bush arranged on the first frame plate 20. The fast-mode idler wheel 91 is mounted on a spindle which extends through an opening in the frame plate 20 and, on the side of the first frame plate 20 which is remote from the fast-mode idler wheel, forms a pin 94, whose function is to be described in more detail hereinafter.

The flywheel 72 is mounted on a shaft 95, which also extends through the first frame plate 20 and which constitutes a capstan 96 (see FIG. 2) on the side of the frame plate 20 which is remote from the flywheel 72.

The frame plate 20 furthermore carries two reel discs 97 and 98, which carry winding mandrels 99 on the front side of the frame plate 20 as viewed in FIG. 2 which mandrels are adapted to be cooperated with hubs in the cassette for respectively taking-up and supplying magnetic tape in the cassette. Between the reel disc 98 and the winding mandrel 99 there is arranged a friction coupling, not shown, the winding mandrel 99 of the reel disc 98 being rigidly connected to a gear wheel 100. The reel disc 98 itself is rigidly connected to a gear wheel 101 which is coaxial with the gear wheel 100. The teeth of the gear wheel 100 are in mesh with the teeth of an adjacent gear wheel 102, which is adapted to drive a counter mechanism, not shown, for indicating the tape transport. At the rear side of the plate 20 the reel disc 97 is provided only with a gear wheel 103, whose diameter substantially corresponds to that of the gear wheel 100. By pivoting the fast-mode idler arm 92 one way or the other, the fast-mode idler wheel 91 can be coupled to the gear wheel 100 or the gear wheel 103 respectively, the fast-mode idler wheel 91 being in an inoperative central position in the neutral position of the tape deck shown in FIGS. 2 and 5. By a pivotal movement of the normal-mode idler arm 85 the normal-mode idler wheel 84 can be coupled to the gear wheel 101 which has a larger diameter than the gear wheel 100, so that the normal-mode idler wheel occupies an operative position. However, in the neutral position shown in FIGS. 2 and 5 the normal-mode idler wheel is disengaged from the gear wheel 101.

As is shown in FIG. 2 the reel discs 97 and 98 are provided with teeth, which teeth cooperate with active portions of brake arms 104 and 105 respectively. The brake arms constitute a brake-arm unit 106, which lies between the reel discs 97 and 98 and extends in the direction of the magnetic head 17. In the brake-arm unit 106 is a slot which forms a control profile 107 and in which the pin 89 engages so that the control profile can cooperate with the normal-mode idler arm 85. In addition to a central portion the control profile 107 comprises a first end portion 109 and a second end portion 110 which, viewed in FIG. 2, is situated at a shorter distance than the end portion 109 from the reel disc 97. Between the control profile 107 and the end of the brake-arm unit 106 which faces the magnetic head 17 of the brake-arm unit is formed with a substantially rectangular opening 108 which constitutes a positioning element for the pin 94 and thus for the spindle of the fast-mode idler wheel 91, the pin 94 being situated in a corner of the opening 108 which is furthest from the magnetic head 17 in the neutral position shown in FIG. 2. In this neutral position the pin 89 is situated in that end portion 109 of the control profile 107 which is further from the magnetic head 17. At the corner which is situated nearest the magnetic head 17, the opening 108 adjoins a slot 111 in which the pin 94 can be positioned.

Control Linkage

Control of the pins 89 and 94, which will be described in more detail hereinafter, is effected by moving the brake-arm unit 106 in the direction of the arrow B in FIG. 2, the active portions of the brake arms 104 and 105 thereby being disengaged from the teeth of the reel discs 97 and 98. For effecting this movement the brake-arm unit 106, near its end which faces the magnetic head 17, is provided with a pin 112 which extends through the frame plate 20 and engages in a forked portion 113 of a switching lever 114. The switching lever 114 is pivotable about a spindle 115 in the direction of the arrow G in FIG. 2. On the side of the spindle 115 opposite to the forked portion 113 the switching lever 114 extends beyond the edge of the frame plate 20 and at this location is provided with a lug 116. To the lug 116 is coupled a switching rod 117 which, at an end thereof which is remote from the lug 116, is connected to the end of a lever 118 which forms part of the central actuating device 70 (see also FIG. 4). The lever 118 is pivotable about a spindle 119 which is journalled in supports 120 which are also formed on the second frame plate 68 by means of an outsert molding technique. The end of the lever 118 which is remote from the switching rod 117 is connected to an end portion of an axially movable magnet core 121 of the solenoid 71.

The switching lever 114 also extends from the forked portion 113 in the direction of the magnetic head 17. On the rear side of the head slide 19 there is arranged a pin 122 (FIG. 5), on which a guide roller 123 is mounted.

This roller extends through a slot 124 in the first frame plate. Behind the frame plate 20 the pin 122 is connected to the end of a tension spring 125, whose end which is remote from the pin 122 is connected to the forked portion 113 of the switching lever 114.

The spring 125 is arranged so that it tends to pivot the lever 114 about the spindle 115 in a direction opposite to the arrow G. Thus, the spring 125 ensures that in the rest position the magnet core 121 occupies the extended position in the solenoid 71 (FIG. 4). The switching lever 114 comprises a fork 126 which has limbs 127 and 128 and cooperates with the guide roller 123. The limb 127 serves for positioning the guide roller 123 and thus the head slide 19. For an accurate movement of the head slide 19 the limb 128 is provided with a positioning profile 129 (see FIG. 2) which comprises three adjoining guide portions and along which the guide roller 123 is movable. This roller is connected to the head slide, and owing to the presence of the spring 125 also serves as a stop. Thus, the switching lever 114, through the three guide portions of the positioning profile 129, is capable of positioning the head slide 19 in three respective positions.

In the neutral position of the tape deck 14 shown in FIG. 2 the free end of the limb 127 engages the guide roller 123 and prevents a further pivotal movement of the lever 114 about the spindle 115 in the direction of the arrow G. Thus, when the cassette holder 15 is open, pivotal movement of the switching lever 114 by energization of the solenoid 71 is prevented. In this way it is also ensured that when the holder 15 is open the brake arms 104 and 105 continuously hold the reel discs 97 and 98 respectively.

Between the spindle 115 and the lug 116 the switching lever 114 is provided with a slot forming a control profile 130 which, as viewed in FIG. 2, has a curved form and which controls a guide roller 131. The guide roller 131 is mounted on a spindle 132, which extends through a slot 133 in the frame plate 20 and which on the front side of the frame plate 20 is connected to a pressure-roller arm 135 which is pivotable about a spindle 134. In order to enable the arm 135 to be pivoted the slot 133 is concentrically curved relative to the spindle 134. On the spindle 134 a pressure-roller bracket 136 is journalled, which comprises two projecting limbs, between which a pressure roller 137 is mounted for rotation. The pressure-roller bracket 136 with pressure roller 137 is pivotable relative to the pressure-roller arm 135, a compression spring 138 maintaining the pressure roller 136 in an extreme position in which a lug 139 which is rigidly connected to the pressure-roller bracket is urged against a stop 140 on the pressure-roller arm 135. By means of this construction the pressure-roller arm 135 and with it the pressure roller 137 is pivotable about the spindle 134 in the direction of the arrow H by the pivotal movement of the switching lever, so that pressure roller 137 can be moved against the capstan 96.

The bounding edge of the end of the pressure-roller arm 135 which is remote from the pressure roller 137 comprise two portions 141 and 142 which are concentrically curved relative to the spindle 134 and between which a radially extending stop portion 143 is situated which constitutes a limiting element for the pivotal movement of a blocking element 144, which element is arranged on the frame plate 20 to be pivotable about a spindle 145. For effecting this pivotal movement in the direction of the arrow J in FIG. 2 a projection 146 of the blocking element 144 is connected to a comparatively weak tension spring 147, whose end which is remote from the projection 146 is also connected to the end of the lever 118 which cooperates with the switching rod 117.

It is to be noted that it is alternatively possible, in a manner not shown, to connect the lever 118 directly in the switching lever 114 and to arrange the tension spring between the projection 146 and the lug 116. Thus, the lug 116 may also form part of the central actuating device 70.

The blocking element 144 carries a stop 148, constituted by a right-angled lug on the edge of the plate-shaped blocking element 144. The stop 148 is adapted to cooperate with the stop portion 143 upon the pivotal movement of the blocking element 144 in the direction of the arrow J and the simultaneous pivotal movement of the pressure-roller arm 135 in the direction of the arrow H. This limits the pivotal movement of the switching lever 114 about the spindle 115 in the direction of the arrow G. The blocking element 144 can be held against movement about the spindle 145 by a retaining element 149, which in the present embodiment is constituted by a comparatively small solenoid. For cooperation with this solenoid the blocking element 144 is provided with an iron plate 150 at an end of the blocking element which is remote from the spindle 145. The force exerted on the blocking element 144 by the retaining element 149 is greater than the force which is exerted by the spring 147 during the pivotal movement of the lever 118, so that the lever 118 cannot pivot the blocking element 144. From the spindle 145 the blocking element 144 extends substantially in a curve past the spindle 115 and terminates in a hook-shaped portion which constitutes a latching element 151. When the retaining element 149 is holding the plate 150, the latching element ensures that the pin 94 and thus the fast-mode idler wheel 91 is retained in the central position between the reel discs 97 and 98.

The operation of the apparatus described in the foregoing is as follows.

CLOSING THE CASSETTE HOLDER

When the apparatus has been switched on by means of the switch 12 and the cassette 16 has been inserted into the cassette holder 15 and the holder 15 pivoted in the direction of the arrow F in FIG. 3 until the projection 43 is latched behind the cooperating portion of the arm 31, the apparatus is ready for use. During this pivotal movement of the cassette holder 15 the free end of the arm 31 is moved by the spring 49 in the direction of the arrow D and the head slide 19 and the magnetic heads 17 and 18 accommodated on said slide have moved over preferably about 3.5–3.8 mm in the direction B under the action of the spring 125 towards the side wall of the cassette 16 formed with openings. In this respect it is to be noted that the end of the arm 31 is now situated at some distance from the edge of the head slide 19 which cooperates therewith. Thus, the closure of the cassette holder 15 results in the magnetic heads 17 and 18 being moved from a neutral position as shown in FIG. 2, in which the magnetic heads are fully withdrawn, into a rest position as shown on FIG. 6. In this position the magnetic heads are situated at the openings of the side wall of the cassette 16, but the heads are still situated at some distance from the magnetic tape contained in the cassette. In the present embodiment, this distance indicated by the reference numeral 152 in FIG. 6, is suitably approximately 0.8 to 1.5 mm. In this rest position the guide roller 123 is positioned against the first portion of the positioning profile 129 on the limb 128 of the switching lever 114. As already described, the sensor 26 on the sensing element 25 is activated simultaneously owing to the displacement of the head slide 19 and the sensor 26 can sense the presence or absence of an anti-erase opening 29a on the rear wall 29 of the cassette.

The closure of the cassette holder 15 also results in the switch 53 releasing the various functions of the tape deck 14. With respect to the other parts of the tape deck the rest position of the tape deck of the apparatus shown in FIG. 6 corresponds to the neutral position of FIG. 2.

In the embodiment shown the apparatus is provided with control means, which include the retaining element 149 and which further comprise an electronic circuit, not shown, in the present embodiment a microprocessor, which is controlled by means of the control buttons 4 and the switch 53.

FAST WINDING OR REWINDING

Depression of the button 7 or 8 for fast winding or fast rewinding of the magnetic tape results in the central actuating device 70, constituted by the solenoid 71 and the lever 118, being energized by the control means. Also, the motor 77 is switched on, the motor rotating in a first or a second direction depending on whether the button 7 or the button 8 has been depressed. Thus, by actuating the button 7 or 8 the central drive wheel 83 is driven in a first or a second direction. Actuation of either of the buttons 7 and 8 results in the control means assuming a first position, in which the retaining element 149 is not energized. As a result of this the force exerted by the magnet core 121 via the lever 118 is capable of pivoting both the switching lever 114 and the blocking element 144. These pivotal movements of the switching lever 114 about the spindle 115 in the direction of the arrow G and the blocking element 144 about the spindle 145 in the direction of the arrow J are such that the stop 148 assumes the position shown in FIG. 7 and the limiting element 143 on the pressure-roller arm 135 then butts against the stop 148. This operative position of the limiting element 143, as a result of the first position of the control means, is defined by the point of intersection of the paths of movement of the stop 148 and the limiting element 143. Thus, if the control means are set to the first position, the depression of the button 7 or 8 results in the switching lever 114 being pivoted in the direction of the arrow G from the rest position shown in FIG. 6 to the first operating position of the tape deck shown in FIG. 7 through a limited angle only.

As a result of this limited pivotal movement into the first operating position the pressure-roller arm 135 has also pivoted about the spindle 134 in the direction of the arrow H through a limited angle only, such that only a small clearance exists between the pressure roller 137 and the capstan 96. Furthermore, said limited pivotal movement of the switching lever 114, together with the action of the tension spring 125, causes the guide roller 123 to cooperate with a second guide portion of the positioning profile 129 on the limb 128. As a result of this, the magnetic heads 17 and 18 will just contact the magnetic tape.

As a result of the limited pivotal movement of the switching lever 114 about the spindle 115 in the direction of the arrow G, the brake-arm unit 106 has also slightly moved in the direction of the arrow B, so that the brake arms 104 and 105 are disengaged from the teeth on the reel discs 97 and 98. In this first operating position of the switching lever the brake-arm unit 106 also occupies an intermediate position in which, as is shown in FIG. 7, the pin 89 is still just situated in the first end portion 109 of the control profile 107, so that the pin 89 occupies an unchanged position relative to the frame plate 20. Thus, the displacement of the brake-arm unit 106 ensures that the pin 89 and thus the normal-mode idler arm 85 and the normal-mode idler wheel 84 are retained in the inoperative position. However, the pin 94 has become disengaged from the corner of the opening 108 which is furthest from the magnetic head 17 and at the same time the latching element 151 has been pivoted into an inoperative position by the pivotal movement of the blocking element 144. Thus, owing to the limited pivotal movement of the switching lever 114 and the pivotal movement of the blocking element 144, the pin 94 is capable of moving relative to the reel discs 97 and 98. When the motor is switched on and the central drive wheel 83 is driven in the first or the second direction a torque is exerted on the fast-mode idler arm 92, which results in a pivotal movement of the fast-mode idler arm, since the pin 94 can be moved owing to the displacement of the brake-arm unit 106 and the release of the latching element 151. The shape of the opening 108 is such that in the pivotal movement of the fast-mode idler arm 92 the pin 94 swings against an edge of the opening in the frame plate 20, unimpeded by the edges of the opening 108. It is to be noted that the opening 108 may alternatively have a different shape from that shown such as circular. It is merely essential that the edges of the opening guide the pin 94 between the centre position and the operative positions.

As is shown in FIG. 7, the fast-mode idler wheel 91 now meshes with the comparatively small gear wheel 100 of the reel disc 98, so that the magnetic tape is rapidly wound in the forward direction. This position corresponds to the actuation of the button 7 on the front plate 2 of the apparatus.

PLAYING

If, after depression of the button 7 or 8, the stop button 9 or the play button 6 is depressed, the control means will no longer energize the solenoid 71, so that under the action of the spring 125 the switching lever 114 returns to the rest position shown in FIG. 6 and at the same time the magnetic heads are moved into the more retracted position with respect to the magnetic tape by the spring. If the play button 6 is depressed, this will immediately be followed by reenergization of the solenoid 71, so that the lever 118 again exerts a force on the switching lever 114 and the blocking element 144. However, as a result of the depression of the play button 6 the control means assume a second position in which the retaining element 149 is activated, which in the present embodiment means that the comparatively small solenoid is energized and the plate 150 is attracted to it, so that the force exerted by the solenoid 149, which is greater than the force exerted by the spring 147, prevents a pivotal movement of the blocking element 144 about the spindle 145.

The control means also cause the motor to be driven in a direction such that the normal-mode idler wheel 84 rotates in the direction of the arrow K. As the blocking element 144 is retained, the stop 148 is inoperative in the second position of the control means, because in this position, as is shown in FIG. 8, the stop is situated outside the path of the stop portion 143. Thus, due to the action of the retaining element 149 the stop 148 is in an inoperative position in the second position of the control means. In the second position of the control means, the switching lever 114 can therefore pivot about the spindle 115 in the direction of the arrow G into a second, fully pivoted operating or operative position. Owing to this pivotal movement of the switching lever 114 and the resulting action of the control profile 130 on the guide roller 131, the pressure-roller arm 135 is pivoted fully in the direction of the arrow H about the spindle 134 to the position shown in FIG. 8, in which position the pressure roller 137 is urged against the capstan 96 under the influence of the spring 138. Thus, an accurate tape transport past the magnetic heads is ensured.

Because of the displacement of the limb 128 and the cooperation of the guide roller 123 with a third guide portion of the positioning profile 129, the magnetic heads are pressed against the magnetic tape, the displacement of the magnetic heads relative to the tape being preferably about 1½ mm greater in comparison with the situation of FIG. 7, so that now a firm head-to-tape contact is obtained. As a result of the pivotal movement of the switching lever 114, the brake-arm unit 106 is moved into a final position in the direction of the arrow B, the pin 94 remaining in the central position between the reel discs 97 and 98 under the action of the latching element 151, and the pin 94 being in a fixed position in the slot 111 owing to the movement of the brake-arm unit 106. The fast-mode idler wheel 91 is then locked in the inoperative central position. Since the second end portion 110 of the control profile 107 is located at a greater distance than the first end portion 109 from the reel disc 98 the pin 89 has moved sideways so that the normal-mode idler arm 85 has pivoted about the spindle 88. As a result of this pivotal movement the normal-mode idler wheel 84 meshes with the gear wheel 101, so that the winding mandrel 99 of the reel disc 98 starts to take up the magnetic tape.

STOPPING

Upon re-depression of the stop button 9 the control means will no longer energize the solenoid 71, so that the motor 77 stops and the brake arms 104 and 105 bring the reel discs 97 and 98 to a standstill. Thus, the tape deck 14 occupies the rest position in FIG. 6. If the cassette 16 is to be removed, sliding the eject button 5 in the direction opposite to the arrow D suffices to cause the cassette holder 15 to pivot in a direction opposite to the arrow F in FIG. 3. As already stated, the movement of the eject button 5 causes the arm 31 to move the head slide 19 in a direction opposite to the arrow B, the magnetic heads 17 thereby being moved to a position which is located outside the cassette. In this position the free end of the arm 31, which serves as a positioning element, positions the head slide in the neutral position shown in FIG. 2.

Thus, in the apparatus in accordance with the invention all functions which are customary for cassette equipment, namely fast winding, playing, actuation of the head slide, pivoting the pressure roller and braking, are controlled through the control actuating device 70. Moreover, the switching lever also activates the sensor 26. This yields the advantage that all functions can be controlled from a central location in the apparatus, so that the apparatus is comparatively simple to assemble using a comparatively small number of components. The construction of the switching lever 114 moreover is such that only a comparatively small operating force is needed for pivoting the switching lever. Furthermore, the construction in accordance with the invention has the advantage that the various components can be accommodated in a comparatively small space. The use of a central actuating device for the control of the various functions of the apparatus moreover offers many possibilities for the use of modern electronic devices, such as a microprocessor.

The use of a four-position head slide 19, which head slide is already moved over some distance when the cassette holder is closed, has the advantage that the central actuating device need only move the head slide over a small distance. The provision of a rest position, and first and second operating positions in addition to a neutral position, furthermore has the advantage that each time the tape deck is switched from the first operating position, winding, to the rest position, the magnetic heads 17 and 18 are moved to a position spaced a small distance from the magnetic tape, but remain inside the cassette. In this way the tape is prevented from sticking to the magnetic heads in the rest position of the tape deck. This is found to be of great advantage, because it renders the tape deck very suitable for locating program passages on the tape, which is effected during fast winding of the tape. Thus, the provision of the additional rest position of the magnetic heads, as the second of the four positions, is of great advantage.

It is to be noted that it is alternatively possible to give the positioning profile 129 a different shape from that shown. For example, if a part of the profile 129 were concentrically curved about the spindle 115, the head slide 19 would not be moved when the switching lever 114 is pivoted between the rest position (FIG. 6) and the first operating position (FIG. 7). The head slide with the magnetic heads would then be adjustable to only three positions.

Second Embodiment

Figure 9:
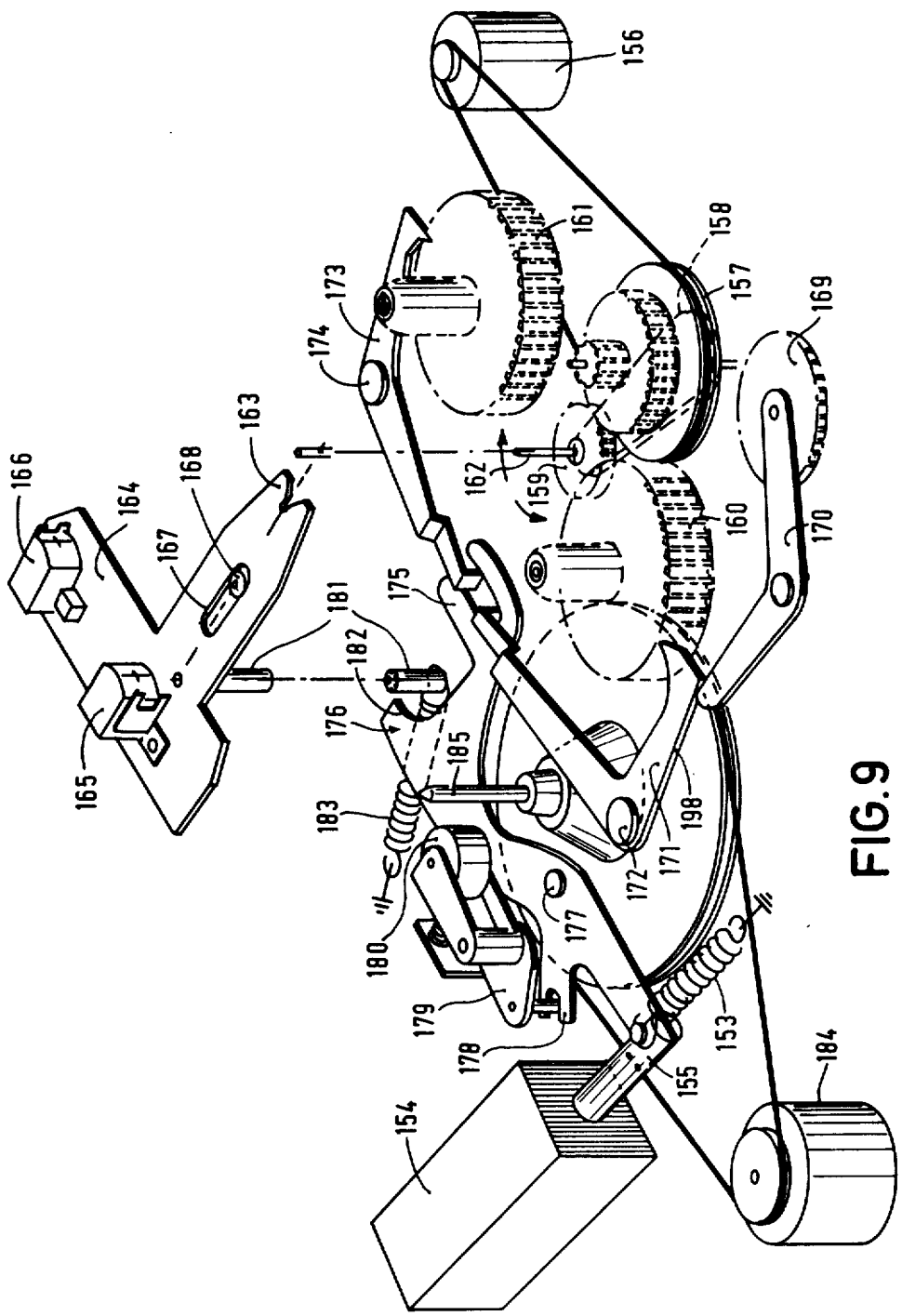
FIG. 9 is an exploded perspective view of that part of the interior of a second embodiment of an apparatus in accordance with the invention, which is relevant for the present invention.

The second embodiments of an apparatus in accordance with the invention, which is shown in FIG. 9, differs from the first embodiment mainly in that it comprises a solenoid 154, whose axially movable core 155, owing to the value of the applied voltage, exerts a smaller force in a first position than in a second position. In this embodiment the central actuating device is constituted by the solenoid 154 and the core 155. This embodiment also comprises control means, not shown, for adjusting the voltage applied to the solenoid 154 to the two levels. In this way an effect is obtained which may be compared with the partial or full insertion of the core 121 in the first embodiment. A tension spring 153 tends to return the core 155 to the rest position shown.

In this second embodiment a motor 156, whose direction of rotation is reversible, drives a central drive wheel 157, which via a friction coupling, not shown, tends to pivot a fast-mode idler arm 158, on which a fast-mode idler wheel 159 is mounted in the direction of the reel discs 160 and 161 respectively. The spindle of the fast-mode idler wheel 159 terminates in a pin 162, which can be maintained in a central position between the reel discs 160 and 161 by means of a latching element 163, which constitutes a unit with a head slide 164 on which magnetic heads 165 and 166 are arranged. For guiding the head slide 164 there is provided a slot 167 in which engages a pin 168 which is connected to the chassis. In order to facilitate the engagement of the pin 162 by the latching element 163 when the head slide 164 is moved, the latching element 163 is provided with V-shaped groove.

The second embodiment also comprises a normal-mode idler wheel 169, which is mounted on a normal-mode idler arm 170, the normal-mode idler wheel 169 being capable of coupling the reel disc 160 to the central drive wheel 157 by the pivotal movement of the normal-mode idler arm 170. The normal-idler arm 170 is controlled by contact with a control profile 198 on a brake-arm 171, which is adapted to cooperate with the reel disc 160 and which is pivotable about a spindle 172. Similarly, there is provided a brake arm 173 near the reel disc 161, which arm is pivotable about a spindle 174. From the spindles 172 and 174 the brake arms extend toward each other, their adjacent ends being situated in a forked portion 175 of a switching lever 176. The switching lever 176 is pivotable about a spindle 177, whilst the end of the switching lever 176 which is remote from the forked portion 175 is connected to the end of the core 155. The switching lever 176 further comprises a fork 178, in which a pin fixed on a pressure-roller arm 179 engages. The pressure-roller arm 179 carries a pressure roller 180.

A pin 181 is connected to the head slide 164. In the rest position of the tape deck the pin 181 is situated at a small distance of approximately 4 mm from an edge portion 182 of the switching lever 176, which edge portion, as shown in FIG. 9, is curved about the axis of the pin 181. There is further provided a tension spring 183 which is connected to the pin 181 and the chassis and which tends to move the head slide 164 in a direction away from the reel discs 160 and 161, the end of the slot 167 which is remote from the head 165 serving as a stop for the head slide movement. In the present embodiment the force required for lifting the brake arms 171 and 173 off the reel discs 160 and 161 is approximately 75 grams, whilst the force required for moving the head slide 164 against the force of the spring 183 is approximately 250 grams. In principle, the force necessary for lifting the brake arms 171 and 173 off the reel discs 160 and 161 and for moving the slide 164 is approximately 2 to 4 times as great as the force necessary for only lifting the brake arms. The operation of the apparatus in the second embodiment is as follows:

FAST WINDING OR REWINDING

The motor 156 and the solenoid 154 are switched on simultaneously by control means, not shown, the solenoid receiving a voltage such that the force of approximately 75 grammes necessary for lifting the brake arms 171 and 173 off the reel discs can be produced, but not the force of approximately 250 grammes necessary for moving the head slide 164. In this way the pin 181 on the head slide serves as a stop of the pivotal movement of the switching lever 176, so that in this embodiment the head slide 164 constitutes a movable blocking element. In the present embodiment the blocking element is positioned by applying a comparatively low voltage to the solenoid 154. When the motor is driven the normal-mode idler wheel 169 is held in the inoperative position in this first, partly pivoted, operating position of the switching lever 176, whereas the fast-mode idler wheel 159 is coupled to one of the reel discs 160 or 161.

PLAYING

In this mode the solenoid 154 is first switched on by the control means, the applied voltage now being so high that the force of approximately 250 grams can be overcome so that the head slide 164 is moved in the direction of the reel discs, the latching element 163 engaging the pin 162 to hold it in the central position, as a result of which the fast-mode idler wheel 159 remains in the inoperative position. The brake arms 171 and 173 are now situated at a comparatively greater distance from the reel discs 160 and 161. Owing to this comparatively large pivotal movement of the brake arms compared with their limited pivotal movement in the fast-winding mode, the normal-mode idler wheel 169 comes into engagement with both the reel disc 160 and the central drive wheel 158, so that when the motor 156 is switched on after a small delay, the reel disc 160 is driven. In this embodiment use is made of a separate motor 184, which drives a flywheel and a capstan 185 connected thereto. The pressure roller 180 is moved against the capstan by the larger pivotal movement of the switching lever 176. It is to be noted that in the first embodiment it is alternatively possible to employ a separate drive motor for the capstan 96.

Third Embodiment

Figure 10:
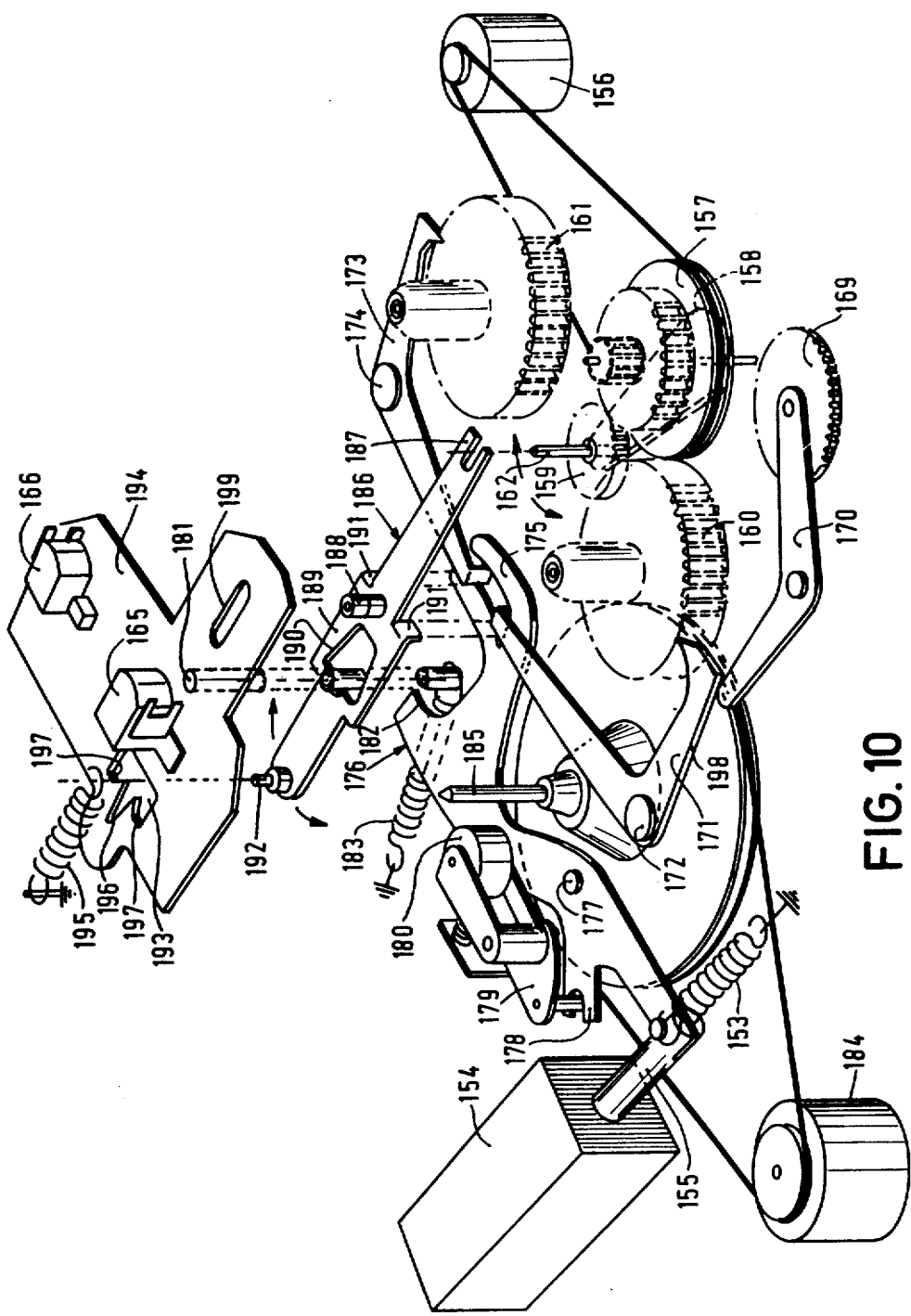
FIG. 10 is an exploded perspective view of that part of the interior of a third embodiment of an apparatus in accordance with the invention which is relevant to the present invention.

The third embodiment of the apparatus in accordance with the invention which is shown in FIG. 10, comprises a number of components which correspond to those of the second embodiment and which therefore bear the same reference numerals. The pin 162 in this embodiment is coupled to a fork-shaped end portion 187 of a latching element 186. The latching element 186 is pivotable about a spindle 188 on a chassis, not shown. The latching 186 comprises a central portion 189, situated near the spindle 188, which is provided with a substantially trapezium-shaped opening 190. The central portion further comprises two downwardly bent lugs 191, whose free ends are adapted to engage with the end portions of the brake arms 171 and 173. As a result of this engagement the latching element 186 is positioned in a central position at equal distances from the reel discs 160 and 161.

On the end of the latching element 186 which is remote from the fork-shaped end portion 187 there is arranged a pin 192, which pin extends through a profiled opening 193 in a head slide 194 which carries the magnetic heads 165 and 166. The pin 192 is connected to one end of a comparatively weak tension spring 195, whose other end is attached to the chassis. The spring 195 is arranged so that it tends to position the latching element 186 in the central position at equal distances from the two reel discs 160 and 161.

In the rest position of the tape deck the pin 192 is situated against the edge of the opening 193 which is adjacent the magnetic head 165. In the opposite edge of the opening 193, which edge is situated at a greater distance from the magnetic head, is a deep V-shaped recess 196, and on both sides of this recess are edge portions 197 which are less deeply recessed. Each edge portion 197 adjoins the recess 196 in such a manner that during the movement of the head slide the pin 192 engages in one of the recessed edge portion 197 after only a small pivotal movement of the latching element 186. On the underside (as viewed in FIG. 10) the head slide 194 is provided with a pin 181, to which a spring 183 is secured which tends to move the pin 181, and thus the head slide 194, away from the reel discs 160 and 161. In this embodiment the pin 181 is also situated at a small distance of approximately 4 mm from the edge portion 182 of the switching lever 176 in the rest position of the tape deck. The head slide 194 is further formed with a slot 199 through which the spindle 188 extends and which serves as the equivalent of the slot 167 in the first embodiment for guiding and limiting the movement of the head slide 194.

In this embodiment there are also provided control means, not shown, for controlling the pivotal movement of the switching lever 176 about the spindle 177 into a firstly, partly pivoted operating position and into a second, partly pivoted operating position respectively, in which the magnetic core 155 is partly or fully retracted respectively. The operation of the apparatus in the third embodiment is as follows:

FAST WINDING OR REWINDING

In order to set the apparatus to the fast winding or fast rewinding mode, the motor 156 is first of all switched on by the control means in the respective one of the two directions of rotation. Subsequently, after a delay of approximately 0.1 sec, the control means energize the solenoid 154, so that the switching lever 176 is pivoted about the spindle 177. Owing to this pivotal movement the edge portion 182 engages the pin 181, as a result of which the head slide 194 is moved over some distance in the direction of the reel discs 160 and 161. Owing to this movement the pin 192 is disengaged from the edge of the profiled opening 193, so that as a result of the torque exerted on the fork-shaped end portion 187 of the latching element 186 by the pin 162 the fork-shaped end portion 187 is pivoted with the pin 162 in the direction of one of the reel discs 160 and 161. This pivotal movement is possible because the forked portion 175 of the switching lever 176 has pivoted the brake arms 171 and 173 and the lugs 191 are clear of the brake arms. The torque exerted on the end portion 187 is capable of expanding the spring 195. The fast-mode idler wheel 159 then meshes with the reel disc 160 or 161. Due to the pivotal movement of the latching element 186 and the movement of the head slide 194 one of the edge portions 197 is of the opening 193 is moved against the pin 192. This position of the pin 192 against the relevant edge portion 197 prevents the switching lever 176 from being pivoted any further. Thus, in comparison with the preceding embodiments, the latching element 186 also constitutes a blocking element and the pin 182 constitutes a stop for limiting the pivotal movement of the switching lever.

PLAYING

In order to set the apparatus to the playing mode, the control means first energize the solenoid 154. The motor is not yet being driven. The pin 192 is maintained in the central position by the spring 195. The switching lever 176 moves the head slide over a greater distance in the direction of the reel discs 160 and 161, which is possible because the pin 192 can move into the deep recess 196 in the edge of the opening 193. This positioning of the pin 192 also ensures that the latching element 186 remains in the central position, so that the fast-mode idler wheel 159 is latched in the central position. Owing to the comparatively large displacement of the head slide 194 the brake arms 171 and 173 are now also pivoted over a greater distance. As in the second embodiment the normal-mode idler wheel 169 is thereby brought into engagement with both the reel disc 160 and the central drive wheel 158. Simultaneously, the pressure roller 180 is moved against the capstan 185. Subsequently, the control means switch on the motors 156 and 184 after a small delay.

Fourth Embodiment

Figure 11:
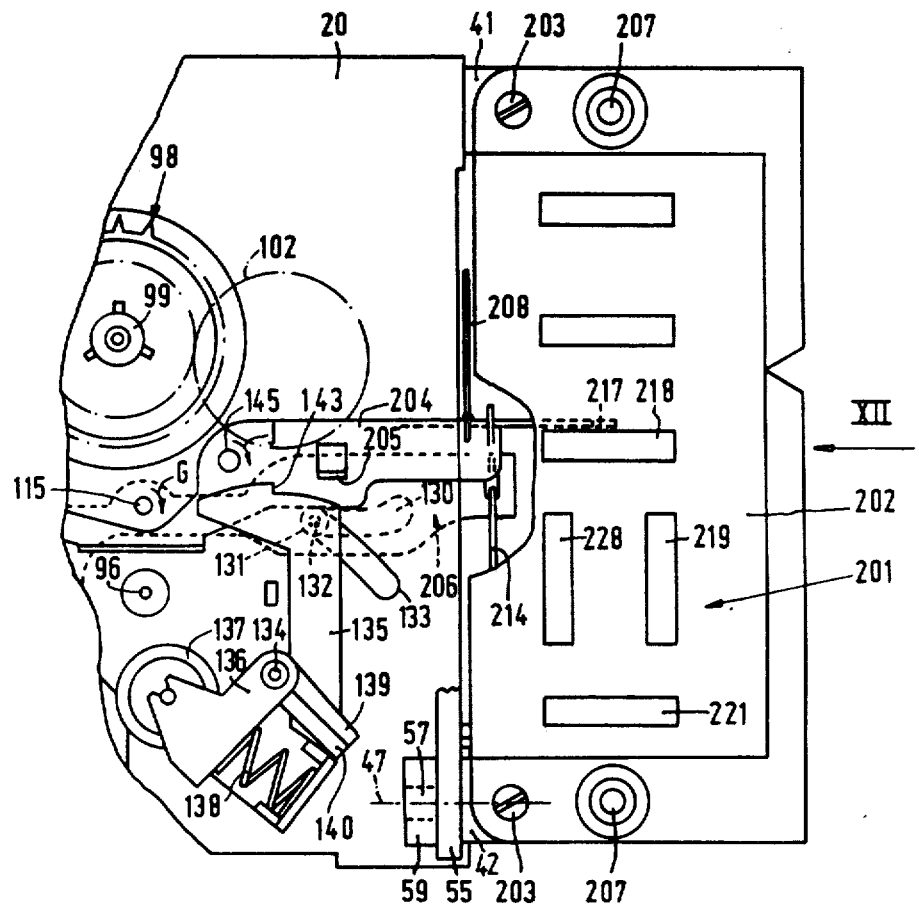
FIG. 11 is a front view of part of a fourth embodiment of an apparatus in accordance with the invention.
Figure 12:
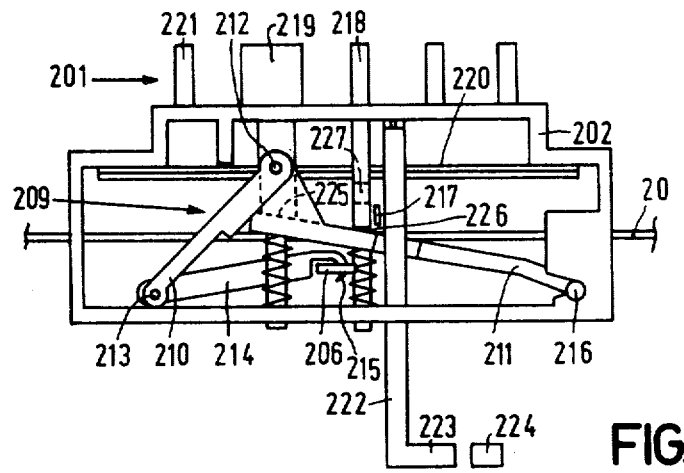
FIG. 12 is a schematic view looking in the direction of the arrow XII in FIG. 11, the parts shown being in a rest position.
Figure 13:
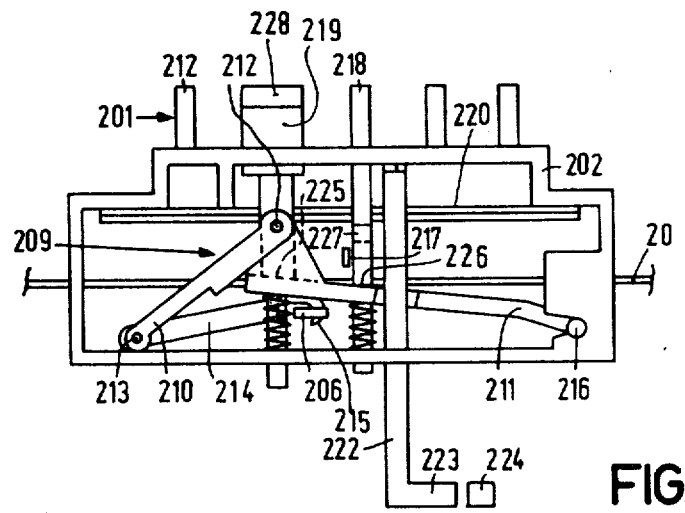
FIG. 13 is a view similar to that of FIG. 12 but with the parts shown in a first operating position.
Figure 14:
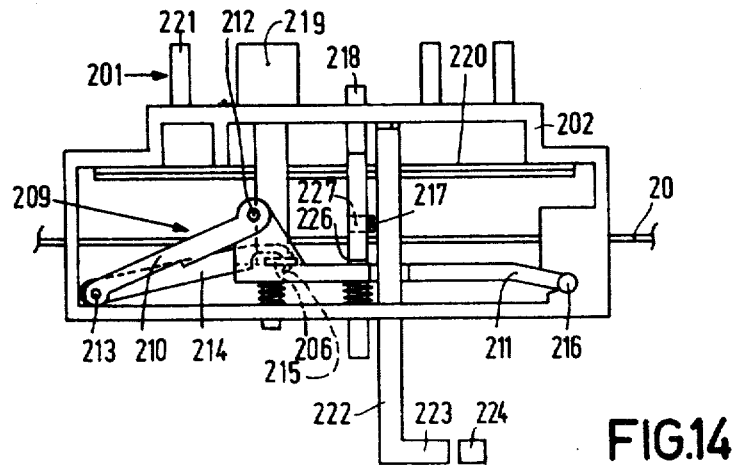
FIG. 14 is a view similar to that of FIG. 12, the parts shown being in a second operating position.

FIG. 11 shows a fourth embodiment of an apparatus in accordance with the invention, in which instead of the electrically operated control buttons 4 six mechanically operated control buttons 201 are provided. The buttons are arranged on the keyboard 202, which is preferably made of plastics and which, as is shown in FIGS. 12–14, constitutes a housing for a switching mechanism, to be described in more detail, which is associated with the buttons 201. The keyboard 202 is connected to the lugs 41 and 42 on the first frame plate 20 by means of screws 203.

In this embodiment the tape deck comprises a blocking element 204 which is largely identical to the blocking element 144 in the first embodiment but which near the keyboard 202 has a different shape from that of the blocking element 144. Like the blocking element 144 the blocking element 204 comprises a stop 205, constituted by a bent lug, which serves for limiting the pivotal movement of a switching lever 206, which at least substantially corresponds to the switching lever 114 in the first embodiment. Further parts corresponding to those in the first embodiment bear the same reference numerals. The keyboard 202 carries two bushes 207, in which screws can be fitted, in a manner not shown, for securing the keyboard in the housing 1.

As shown in FIGS. 11 and 12 the blocking element 204 extends beyond the edge of the frame plate 20 over some distance, a spring-steel wire 208 being connected to this part of the blocking element 204 and, in a manner not shown, to the second frame plate 68. The spring wire 208 tends to pivot the blocking element 204 about the pivoting spindle 145 in the direction of the arrow J, which pivotal movement is limited by the edge of the blocking element 204 abutting the roller 131 in the end position shown. In FIG. 12 the control buttons 201 are in neutral positions, which means that a central actuating device 209, comprising a toggle mechanism formed by two plates 210 and 211 which are pivotably arranged relative to each other, is in a position such that a spindle 212 which pivotably connects the plates is located in an upper position as viewed in FIG. 12. By means of a pin 213 which is integral with the plate 210, this plate is connected to a coupling rod 214, which at its end remote from the pin 213 comprises a hook 215 which engages in a recess near the free end of the switching lever 206.

In the neutral position shown in FIG. 12 the end of the switching lever 206 is in an extreme right position as viewed in FIG. 12. As viewed in FIG. 12 the plate 211 extends obliquely downwards from the spindle 212, the end of the plate 211 which is remote from the spindle 212 constituting a unit with a pin 216 which is pivotably journalled in a recess in the keyboard 202. At its end which projects beyond the frame plate 20 the blocking element 204 comprises a lug 217, which extends upwards as viewed in FIG. 12 and which under the influence of the spring-steel rod 208 is pivotable to the left, as viewed in FIG. 12, but which through the contact of the edge of the blocking element 204 with the roller 131 is retained in the position shown in FIGS. 11 and 12.

For the sake of simplicity only a play button 218 and a fast wind button 219 are shown in more detail in FIGS. 12 and 14. In a manner not shown the buttons cooperate with latching plates 220, which retain the respective buttons in the operating position in accordance with FIGS. 13 and 14 respectively and which can be unlatched from the operating position by means of a stop button 221. The latching plates 220, for releasing the button which is in the operating position can also be moved by a lever 222, which is arranged to be pivotable relative to the keyboard 202 and which at a free end comprises a nose 223. The nose 223 can be coupled to a switching rod 224, which coupling is effected if the take-up reel disc 98 has stopped due to the end of tape being reached. Owing to the coupling of the switching rod 224 with the nose 223 the lever 222 is pivoted, so that, in a manner not shown, such as for the stop button 221, the latching plates 220 are moved and the relevant button is released from its operating position. When the buttons are released the drive of the apparatus is switched off at the same time.

In FIG. 13 the button 219 is depressed. As a result of this the button presses against the plate 211 with an end portion 225, so that the spindle 212 is moved in a downward direction as viewed in FIG. 13. Owing to this movement the plate 210 is pivoted about the pin 213, the pin 213 being simultaneously moved to the left as viewed in FIG. 13. Owing to this movement of the pin 213 the coupling rod 214 is also moved to the left, so that the switching lever 206 is pivoted in the direction of the arrow G about the spindle 115.

This pivotal movement produces a situation which may be compared with the situation of the first embodiment which is shown in FIG. 7. The pivotal movement causes the pressure-roller arm 135 and with it the guide roller 131 to be pivoted. Thus, the edge of the blocking element 204 is disengaged from the roller 131. However, as the lug 217 is now moved to the left (FIG. 13) under the influence of the spring wire 208, the blocking element 204 is pivoted about the spindle 145 so that the stop 205 is set to the operative position by the positioning of the blocking element 204. Through cooperation with the limiting element 143 on the pressure-roller lever 135 the pivotal movement of the switching lever into the firstly, partly pivoted operating position is limited as already described with reference to FIG. 7.

If the play button 218 is depressed, as is shown in FIG. 14, an end portion 226 of the button 218 presses against the plate 211, the plate 211 thereby being pivoted downwards over a greater distance in comparison with the situation shown in FIG. 13 because the button 218 is situated nearer the pin 216. The plate 211 is then position substantially parallel to an adjacent bottom plate of the keyboard 202. As a result of this the pin 213 is moved to the left over a greater distance and the switching lever 206 is also situated further to the left than in the situation shown in FIG. 13.

By means of a retaining element, constituted by a projection 227 on the control button 218, the lug 217 is prevented from moving to the left during the depression of the button 218. As is shown in FIG. 14, the lug 217 is still in the position shown in FIG. 12, after depression of the button 218. As a result of this the blocking element 204 is not pivoted upon depression of the button 218, so that the stop 205 is inoperative. In this situation the switching lever 206 can thus be pivoted fully into the second operating position, which position corresponds to the position shown in FIG. 8 for the first embodiment. The projection 227 constitutes a retaining element for rendering the stop 205 inoperative, which element may be compared with the solenoid 149 in the first embodiment.

It is to be noted that upon depression of a fast rewind button 228, adjacent the fast wind button 219, the operation of the central actuating device differs from the situation shown in FIG. 13, only in that as in the first embodiment, driving is effected in the opposite direction.

Furthermore, it is to be noted that in the case of the mechanically actuated control buttons 201 it is of advantage that the head slide 19 is already moved over some distance in the direction of the tape by closure of the cassette holder 15. Thus, in particular the force to be produced by the button 218 for moving the head slide is comparatively light, because the head slide is to be moved over a limited distance only. A further advantage of the described embodiment with the mechanically actuated control buttons 201 is that through the arrangement of the central actuating device 209 and the presence of the switching lever 206 the buttons at the front of the apparatus may be situated to one side of the cassette tape deck. Thus, the height of the apparatus can be comparatively small.

What is claimed is:

1. A magnetic tape apparatus comprising:
two reel discs for driving tape reels,
a capstan arranged to engage a tape extending between the reels,
a pressure roller movable toward said capstan for urging tape against the capstan,
a central drive wheel, and means for rotatably driving said wheel,
a pivotable normal-mode idler arm having a normal-mode idler arranged thereon for rotation,
a pivotable fast-mode idler arm having a fast-mode idler arranged thereon for rotation, said idler arms being respectively movable between respective inoperative and operative positions,
means for driving at least one of said reel discs responsive to rotation of said central drive wheel while one of said idler arms is in an operative position,
a pivotable switching lever,
means responsive to said lever position for positioning the idler arms and pressure roller, and
means, including a central actuating device, for pivoting said lever,
characterized in that said means for rotatably driving selectively drives the central drive wheel in either direction,
said means for positioning includes means for uncoupling the fast-mode idler arm and, responsive to the direction of the central drive wheel rotation, for moving the fast-mode idler arm from an inoperative central position between the reel discs into a first or second operative position to drive one or the other reel disc,
said means for pivoting moves the pivoting lever solely by the central actuating device, and
said apparatus further comprises control means which can be set to first and second positions, for selectively limiting pivotable movement of said lever from a rest position to a first, partly pivoted position or to a second, fully pivoted position; in said first position, said fast-mode idler arm being uncoupled from the switching lever, and said means for positioning maintaining the normal-mode idler arm in the inoperative position; in said second position said means for positioning maintaining the fast-mode idler arm in the inoperative position, and maintaining the normal-mode idler arm in the operative position, and means for coupling the head slide to the switching lever for moving the head slide to a fast-mode position or normal-mode position respectively as the switching lever moves to the partly or fully pivoted positions.

2. An apparatus as claimed in claim 1, characterized in that said control means includes a movable blocking element which further includes a stop for limiting the pivotable movement of the switching lever, positioning of the blocking element causing the stop to be operative only in the first position of the control means.

3. An apparatus as claimed in claim 2, characterized in that the control means further comprising a retaining element for positioning the blocking element, the retaining element being coupled to the blocking element in the second position only of the control means, such coupling rendering the stop inoperative.

4. An apparatus as claimed in claim 3, characterized in that the control means further comprises a spring connecting the blocking elements to the central actuating device, the force exerted on the blocking element by the retaining element when coupled being greater than the spring force.

5. An apparatus as claimed in any one of claims 2, 3 or 4, characterized in that said control means comprises a limiting element movable with the switching lever; and in the first position of the control means, the limiting element cooperates solely with the stop to limit pivotable movement of the switching lever into the first operative position, said first operative position being determined by a point of intersection of paths of movement of the stop and the limiting element.

6. An apparatus as claimed in claim 5, characterized in that the limiting element forms part of the pressure roller arm.

7. An apparatus as claimed in claim 1, characterized in that said control means comprises means, responsive to the control means being in the second position, for latching the fast-mode idler arm in the central position during pivotal movement of the switching lever.

8. An apparatus as claimed in claim 3, characterized in that said control means comprises means, responsive to the control means being in the second position, for latching the fast-mode idler arm in the central position during pivotal movement of the switching lever, said means for latching being integral with said blocking element; in said second position of the control means, the latching element occupying an operative position through coupling of the blocking element with the retaining element.

9. An apparatus as claimed in claim 1, further comprising a reel brake arm, characterized in that said means for positions includes a control profile on said reel brake arm, and means connecting to said normal-mode idler arm for engaging said control profile to control movement of the normal-mode idler wheel between the inoperative and the operative positions.

10. An apparatus as claimed in claim 1, characterized in that the head slide includes a stop, and said switching lever includes a positioning profile arranged to engage said stop, said profile including three adjoining guide portions for positioning the head slide in three different positions respectively corresponding to the rest position and the first and second operating positions of the switching lever; and in that the apparatus further comprises means for coupling the head slide to a separate positioning element for positioning the head slide in a fourth, neutral position.

* * * * *